(12) United States Patent
Koryakin et al.

(10) Patent No.: US 10,691,435 B1
(45) Date of Patent: Jun. 23, 2020

(54) PROCESSOR REGISTER ASSIGNMENT FOR BINARY TRANSLATION

(71) Applicant: Parallels International GmbH, Schaffhausen (CH)

(72) Inventors: Alexey Koryakin, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 16/199,724

(22) Filed: Nov. 26, 2018

(51) Int. Cl.
  *G06F 9/44* (2018.01)
  *G06F 8/52* (2018.01)
  *G06F 9/30* (2018.01)

(52) U.S. Cl.
  CPC ............ *G06F 8/52* (2013.01); *G06F 9/30101* (2013.01)

(58) Field of Classification Search
  CPC ........................................................ G06F 8/52
  USPC ........................................................ 717/152
  See application file for complete search history.

(56) References Cited

U.S. PATENT DOCUMENTS

| | | | |
|---|---|---|---|
| 6,986,128 B2 * | 1/2006 | Linden | G06F 9/45516 717/140 |
| 7,856,547 B1 | 12/2010 | Koryakin et al. | |
| 8,176,488 B1 | 5/2012 | Dobrovolskiy et al. | |
| 2001/0004755 A1 * | 6/2001 | Levy | G06F 9/30076 712/217 |
| 2011/0307876 A1 * | 12/2011 | Ottoni | G06F 8/441 717/153 |

OTHER PUBLICATIONS

Techopedia.com, "Default Values", Nov. 2011, https://web.archive.org/web/20120113035706/https://www.techopedia.com/definition/24362/default-values-database (Year: 2011).*

* cited by examiner

*Primary Examiner* — Wei Y Zhen
*Assistant Examiner* — Lanny N Ung
(74) *Attorney, Agent, or Firm* — Lowenstein Sandler LLP (57) ABSTRACT

Systems and methods for binary translation of executable code. An example binary translation method comprises: decoding a current source code fragment compatible with a source instruction set architecture (ISA); identifying a first source register referenced by the current source code fragment; determining that the first source register is not referenced by a register mapping table, wherein the register mapping table comprises a plurality of entries, each entry specifying a source register, a target register, and a weight value; identifying, among the plurality of mapping table entries, a mapping table entry comprising a highest weight value, wherein the identified mapping table entry specifies a second source register and a second target register; replacing, in the identified mapping table entry, an identifier of the second source register with an identifier of the first source register; and translating, using the mapping table entry, the current source code fragment into a target code fragment, wherein the target code fragment is compatible with a target ISA.

15 Claims, 9 Drawing Sheets

PROCESSOR REGISTER ASSIGNMENT FOR BINARY TRANSLATION

TECHNICAL FIELD

The present disclosure is generally related to translation of binary code, and is specifically related to register allocation for systems and methods for processor register assignment for binary translation.

BACKGROUND

Binary translation is a process of translating a source executable code to a target executable code, such that the source executable code utilizes instruction from a source instruction set and is intended to run on a source processor architecture (platform), while the target executable code utilizes instructions from the target instruction set and is intended to run on a target processor architecture (platform).

DETAILED DESCRIPTION

Described herein are systems and methods for optimized processor register assignment for binary translation.

Performing binary translation of a source code executable on the source processor architecture (platform) produces a target code executable on the target processor architecture (platform). The target platform is generally different from the source platform, however, in certain implementations, the target platform may match the source platform (e.g., for implementing virtualization solutions). Furthermore, the binary translation process may implement certain limitations with respect to certain specified aspects of the target code (e.g., the target executable code may be limited to a certain execution mode (such as 32-bit or 64-bit execution mode), the target executable code may be limited to the userspace, etc.).

The binary translation process may involve processing an input sequence of source code instructions in order to generate, based on one or more templates and a set of register mappings, a sequence of target code instructions from the target instructions set. Each template may specify a sequence of one or more source platform opcodes and a corresponding sequence of one or more target platform opcodes. "Opcode" herein refers to a portion of an executable instruction that specifies the operation to be performed (e.g., the opcode corresponding to the MOV instruction utilized in certain processor architectures specifies copying the contents of the source memory or register to the target memory or register). Accordingly, in an illustrative example, the binary translation process may involve processing a source code portion including a sequence of the source instructions in order to generate a corresponding target code portion including a sequence of the target instructions, by substituting the source platform opcodes with the corresponding target platform opcodes identified by the relevant opcode mapping template, and substituting each source platform register with the corresponding target platform register identified by the relevant source-to-target register mapping.

In an illustrative example of a binary translation-based virtualization solution, the target platform may match the source platform, but some of the target platform registers may be reserved for the virtualization support (e.g. to reference virtualization-related memory data structures), and thus should not be utilized by the target executable code. Accordingly, the static 1:1 allocation of source platform registers to the target platform registers may not always be possible even for same-platform binary translation (i.e., when the target platform matches the source platform). Thus, dynamic register allocation schemes would need to be implemented, such that one code fragment would use one register mapping scheme, while another code fragment would use a different register mapping scheme. The generated target code fragments would need to be connected by tie code fragments, which would perform register saving/restoring to/from the main memory for the target registers which have different source-to-target register mappings in two sequentially executing target code fragments.

The systems and methods of the present disclosure improve the binary translation efficiency by producing optimized source-to-target register mappings which minimize the overhead caused by the register saving/restoring operations which are necessary for connecting together sequentially executed fragments of the generated target code. While the examples herein reference the general purpose registers, the methods and systems of the present disclosure are equally applicable to other architecturally visible registers, including system registers, control registers, machine specific registers, registers of peripheral devices, etc.

Various aspects of the above referenced methods and systems are described in details herein below by way of examples, rather than by way of limitation.

Figure 1:
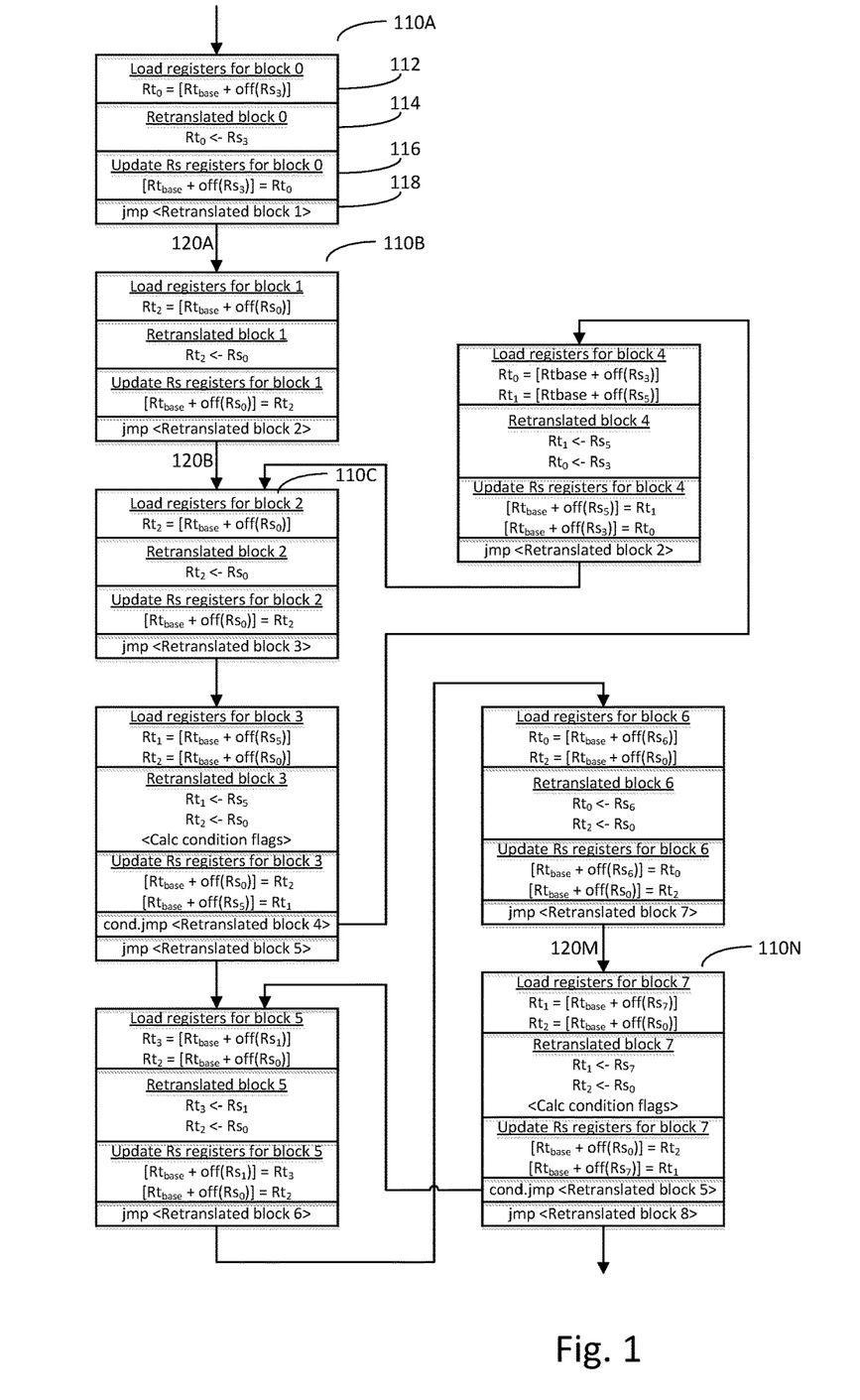
FIG. 1 schematically illustrates an example graph representation of the target executable code generated by the binary translation process, in accordance with one or more aspects of the present disclosure.

FIG. 1 schematically illustrates an example graph representation of the target executable code generated by the binary translation process, in accordance with one or more aspects of the present disclosure. As schematically illustrated by FIG. 1, the graph 100 may include multiple nodes 110A-110N, such that each node 110 would correspond to a target code fragment generated by the binary translation process.

As noted herein above, pairs of sequentially executed fragments of the generated target code need to be connected by tie code fragments, in order to perform register saving/restoring to/from the main memory for the target registers which have different source-to-target register mappings in a pair of sequentially executing target code fragments. The binary translation efficiency is improved by producing optimized source-to-target register mappings in order to minimize the overhead caused by the register saving/restoring operations.

The nodes 110A-110N are interconnected by directed edges 120A-120M, which indicate the sequence of execution of the code fragments depicted by the nodes 110A-110N. A target code fragment depicted by a node 110 may include the following code sections: the prologue 112 for loading the relevant target platform registers from the memory, the translated code itself 114, the epilogue 116 for saving modified target platform register values to the memory, and control transfer instruction(s) 118 for transferring the execution control to the next target code fragment, as described in more detail herein below.

Figure 2:
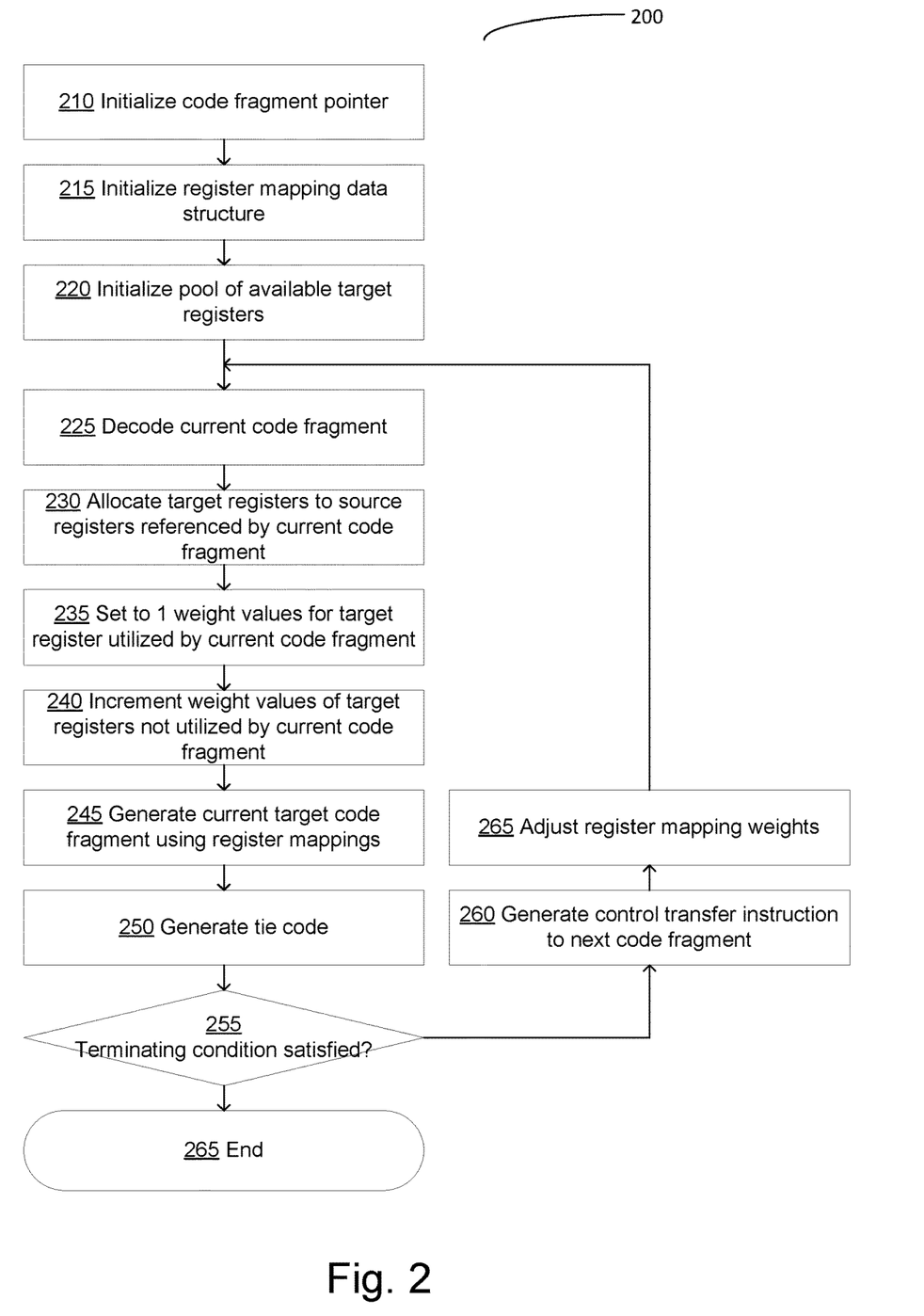
FIG. 2 depicts a flowchart of an example binary translation method implemented in accordance with one or more aspects of the present disclosure.

FIG. 2 depicts a flowchart of an example binary translation method implemented in accordance with one or more aspects of the present disclosure. Method 200 and/or each of its individual functions, routines, subroutines, or operations may be performed by one or more processors of the computer system (e.g., the example computer system 1000 of FIG. 6) implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, a computer system performing binary translation of a source code into a target code may initialize a code fragment pointer indicating the current position within the source code. As schematically illustrated by FIG. 1, the code fragment pointer may be initialized to reference the code fragment 110A; upon processing a portion of the source code starting from the current position of the code fragment pointer to the nearest control transfer instruction (such as conditional or unconditional jump instruction), the code fragment pointer may be updated to reference the next code fragment 110B-110N, until all code fragments would have been processed, as described in more detail herein below.

Figure 3A:
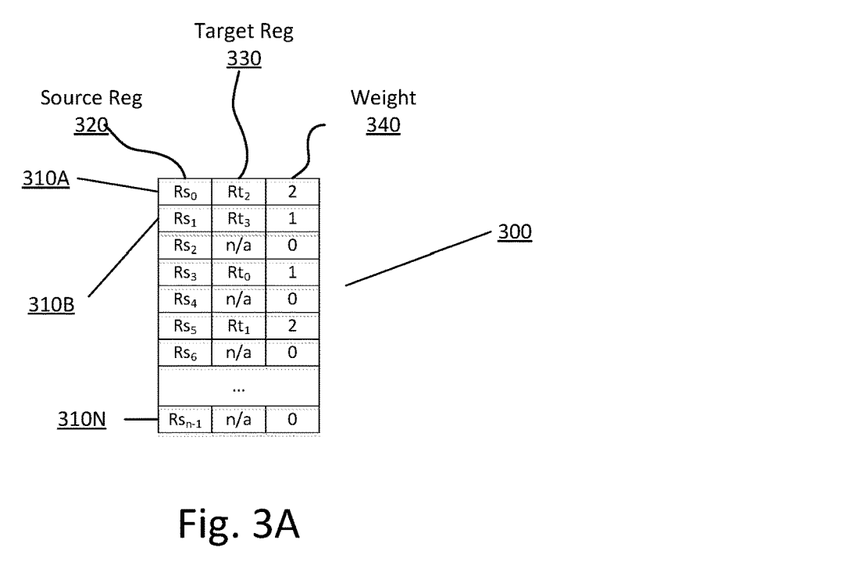
FIGS. 3A-3B schematically illustrate example source-to-target register mapping data structures utilized by systems and methods operating in accordance with one or more aspects of the present disclosure.

At block 215, the computer system may initialize a source-to-target register mapping data structure. As schematically illustrated by FIG. 3A, each record 310A-310N of the data structure 300 may specify a source platform register 320 which is referenced by at least one instruction of the source code, the corresponding target platform register 330 which is used by the target code as the substitute for the source platform register, and a weight value 340. In an illustrative example, the weight value may be indicative of the number of method iterations since the target platform register was last utilized. In another illustrative example, the weight value may reflect the target register usage frequency (e.g., may be proportional to the ratio of the number of times the target register was used to the total number of code fragments generated for a given binary code module). In yet another illustrative example, the weight value may be proportional to the target register usage frequency multiplied by the latest value of the target register usage path length (such that the usage path length is represented by the number of sequentially executed target code fragments which utilize the same assignment of the target register). In various implementations, the weight value may be represented by an integer value or a floating point value. Various other formulas for computing the weight value are also compatible with the methods described herein, provided that such formulas adequately reflect the target register usage pattern in order to prioritize target register selection when no unassigned target registers are available for allocation.

Figure 3B:
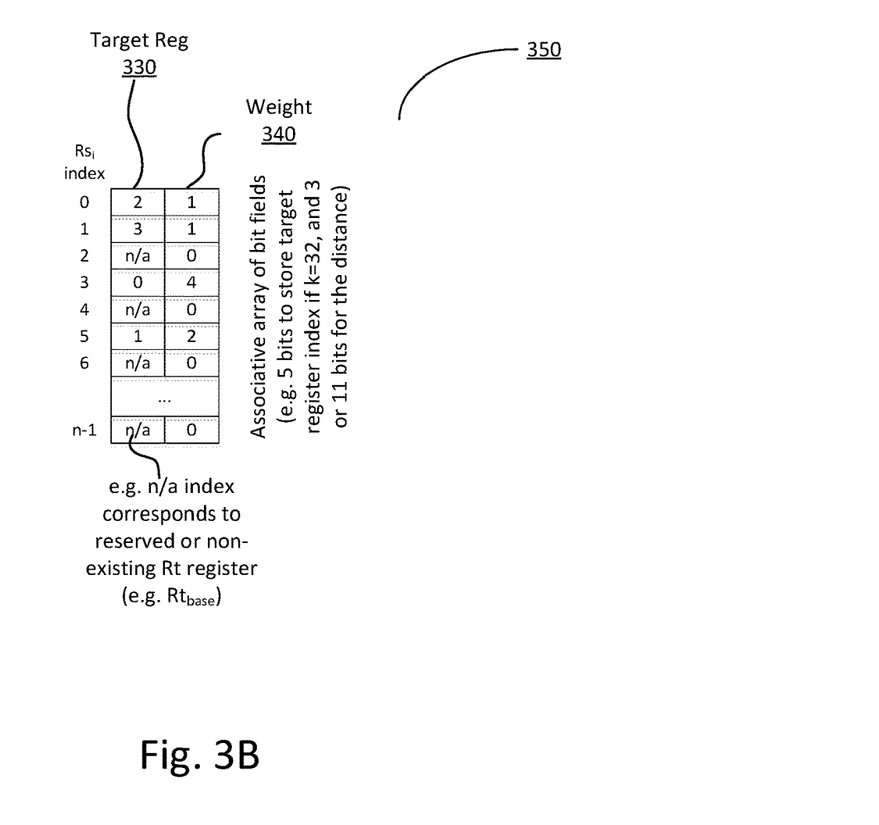

While FIG. 3A illustrates the source-to-target register mapping data structure 300 implemented by a full two-dimensional array, every row of which corresponds to a source register, in another illustrative example, the source-to-target register mapping data structure may be implemented as an associative array 350, which is indexed by the source register identifier, as schematically illustrated by FIG. 3B. Every row of the two-dimensional array 350 includes the identifier of the target register 330 which is used by the target code as the substitute for the source platform register identified by the index of the row within the array 350, and a weight value 340 indicative of the number of method iterations since the target platform register was last utilized. Various other implementations of the source-to-target register mapping data structure, including lists, hash maps, associative arrays, etc., fall within the scope of the present disclosure.

Figure 4A:
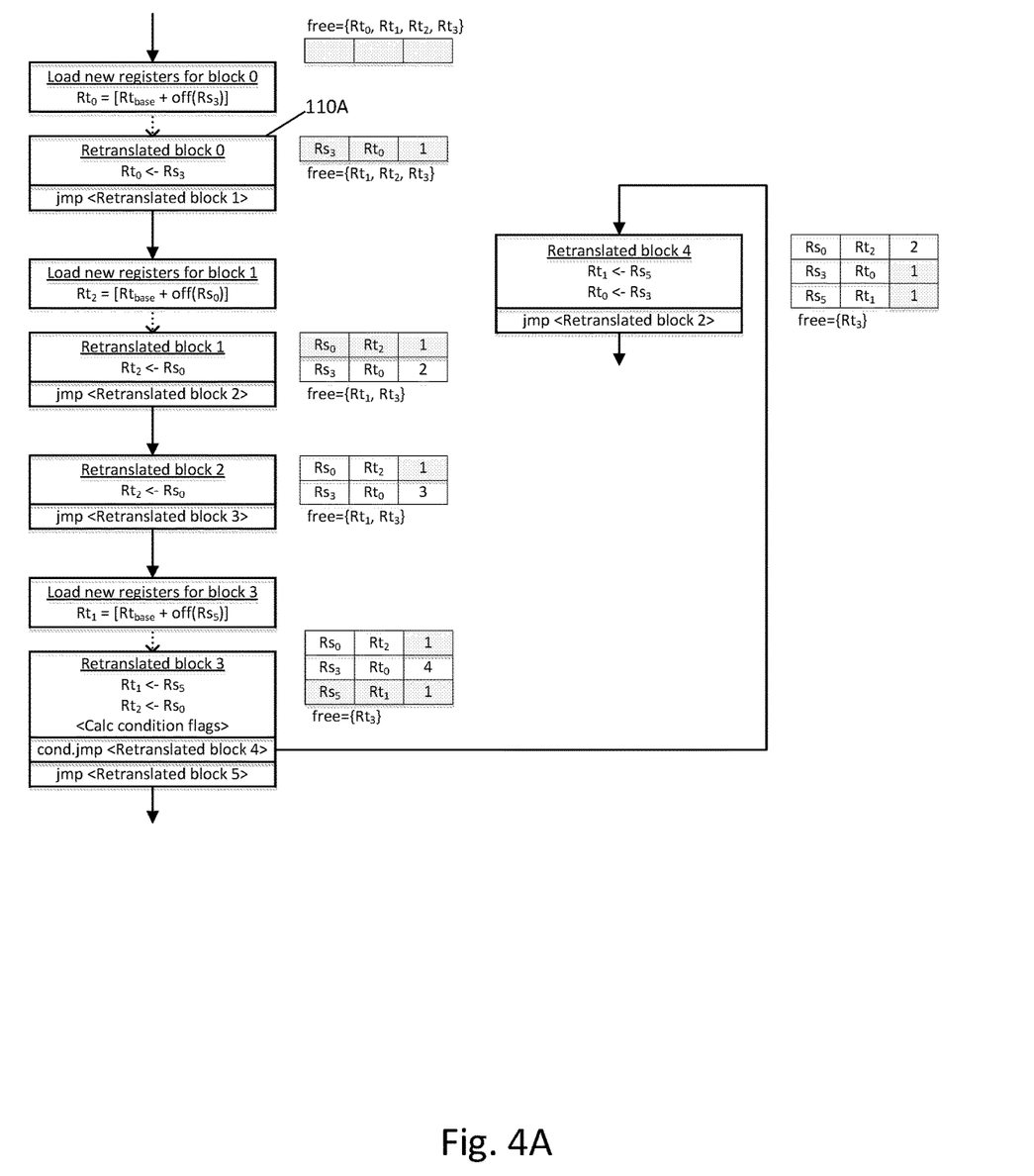
FIGS. 4A-4D schematically illustrate register allocation and tie code generation by systems and methods operating in accordance with one or more aspects of the present disclosure.

Referring again to FIG. 2, at block 220, the computer system may initialize the pool of available target platform registers (i.e., target platform registers which are not used by any of the source-to-target register mappings). As noted herein above, one or more registers of the target platform may be reserved for implementing a virtualization system, thus the pool of available target platform register may be initialized to only include a subset of registers of the target platform. As schematically illustrated by FIG. 4A, before processing the first code fragment 110A, the register mapping data structure is initialized by an empty table, and the pool of available target registers include the target registers Rt0, Rt1, Rt2, and Rt3.

At block 225, the computer system may decode a portion of the source code starting from the current position of the code fragment pointer to the nearest control transfer instruction (such as direct or indirect control transfer instruction, e.g. "B" or "LDR PC, XXX" ARM instructions, or "JMP" instruction in IA-32 and AMD64 architectures). The computer system may identify a set of source platform registers utilized by the portion of the source code.

At block 230, the computer system may allocate a target platform register to each of the identified source platform registers. The allocation process may involve allocating, to each source platform register referenced by the source code fragment, a corresponding target platform register identified by the relevant source-to-target register mapping, based on the set of register mappings inherited from translating the previous code fragment.

For those source platform registers, which are not referenced by any existing source-to-target register mapping, the computer system may allocate target platform registers from the pool of available target platform registers. Such register allocations may be reflected by appending, to the register mapping data structure, new source-to-target register mappings. Upon creating a new source-to-target register mapping, the computer system may remove the target platform register from the pool of available target platform registers. As schematically illustrated by FIG. 4A, processing the first code fragment 110A involves creating a mapping of the source register $Rs_3$ to the target register $Rt_0$, and removing the target register Rt0 from the pool of available target registers.

If the pool contains no available target platform registers, the computer system may identify a target platform register having the maximum last usage weight value specified by the register mapping data structure. The computer system may then modify the identified source-to-target register mapping, by overwriting the source platform register value with the identifier of the source platform register for which no target register is specified by the current set of source-to-target register mappings.

Figure 4B:
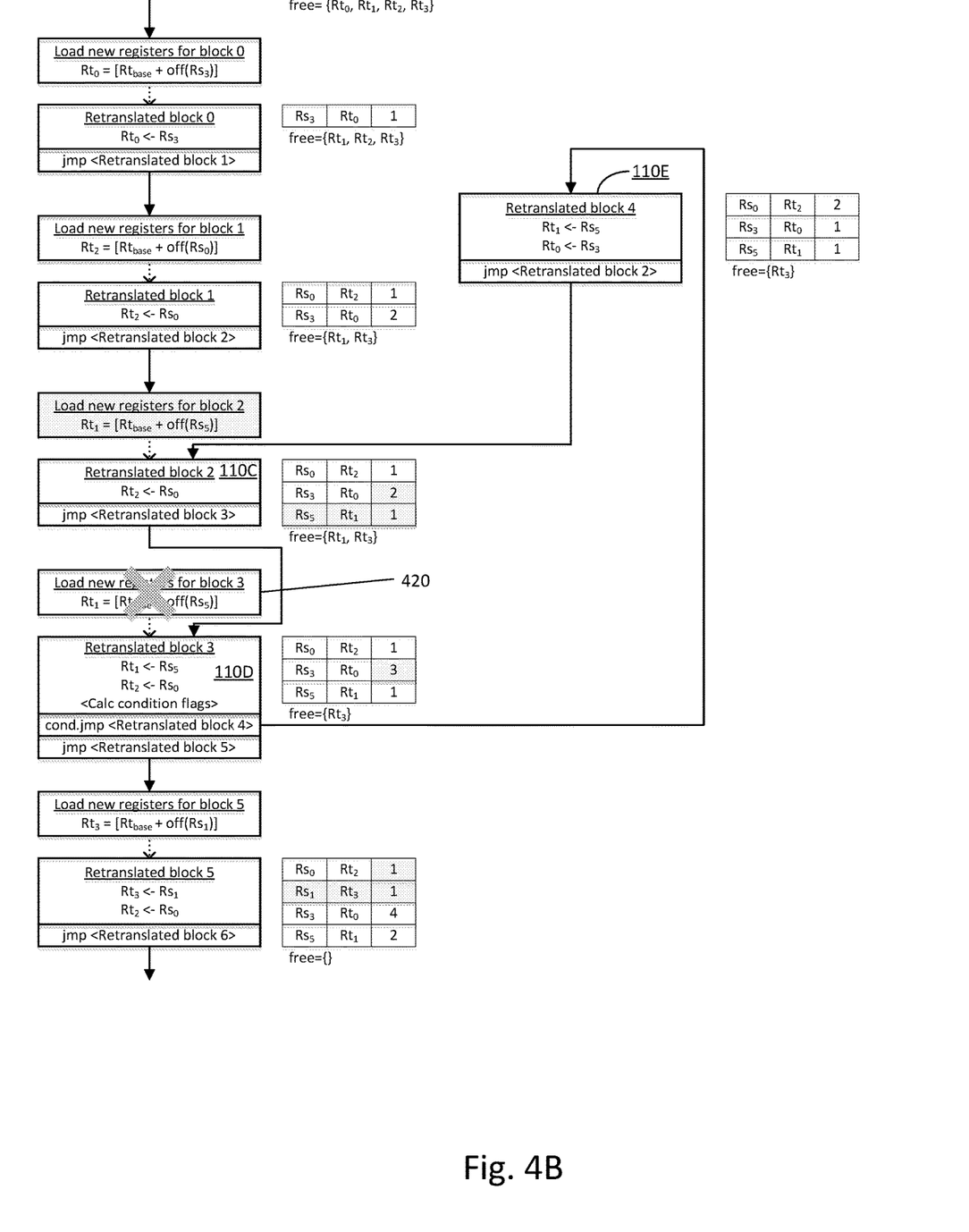
Figure 4C:
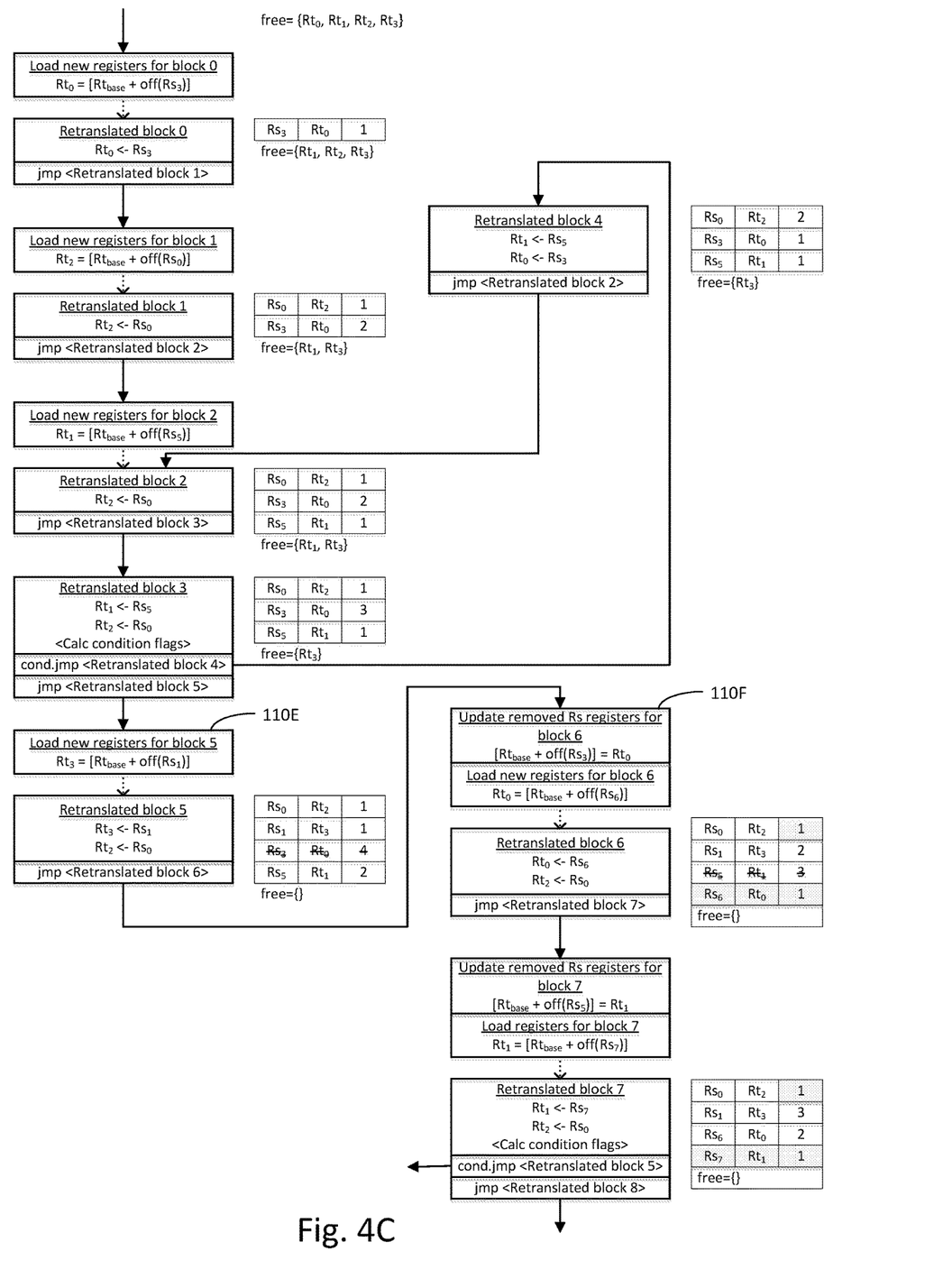

As schematically illustrated by FIG. 4C, processing the code fragment 110E produces the following set of source-to-target register mappings:

| Source Register | Target Register | Weight |
|---|---|---|
| $Rs_0$ | $Rt_2$ | 1 |
| $Rs_1$ | $Rt_3$ | 1 |
| $Rs_3$ | $Rt_0$ | 4 |
| $Rs_5$ | $Rt_1$ | 2 |

The next code fragment—fragment 110F—references the source register Rs6, which is not found in the current set of source-to-target register mappings (i.e., the set produced by processing the code fragment 110E). Furthermore, the pool of available target registers is empty. Accordingly, the computer system performing the binary translation identifies the target platform register having the maximum last usage weight value specified by the register mapping data structure, which is $Rt_0$ having the weight value of 4. The computer system may then remove the identified $Rs_3$-$Rt_0$ mapping and create a new mapping associating $Rs_6$ with $Rt_0$.

Referring again to FIG. 2, at block 235, the computer system may set to a pre-defined initial value (e.g., one) the weights associated with the target platform registers utilized by the current iteration of the method. In particular, the pre-defined initial weight value may be assigned for each source-to-target register mapping which has been re-used from the previous iteration, each newly created source-to-target register mapping which utilizes previously unused target platform registers, as well as each modified source-to-target register mapping which re-assigns a previously utilized target platform register to a different source platform register. As schematically illustrated by FIG. 4C, after processing the code fragment 110F, the weight values for the target registers $Rt_0$ and $Rt_2$, which are utilized by processing the code fragment 110F, are set to 1.

At block 240, the computer system may, for each source-to-target register mapping which has not been used by the current iteration of the method, increment the associated weight by a pre-defined increment value (e.g., one). As schematically illustrated by FIG. 4C, the existing mapping $Rs_1$-$Rt_3$ was not utilized for processing the next code fragment 110F, therefore, the weight value associated with this mapping would be incremented by 1; similarly, the existing mapping $Rs_5$-$Rt_1$ was not utilized for processing the next code fragment 110F, therefore, the weight value associated with this mapping would be incremented by 1.

At block 245, the computer system may utilize the register assignments to generate a portion of the target code corresponding to the portion of the source code which is being processed by the current iteration of the method. Generating the target code may involve substituting the source platform opcodes with the corresponding target platform opcodes, which may be identified using opcode mapping templates.

At block 250, the computer system may generate a tie code fragment to be inserted between the target code fragment generated by the current iteration of the method and the next code fragment. The tie code loads the register values for the register mappings created by the current code fragment. As schematically illustrated by FIG. 4A, processing the code fragment 110A involves creating a mapping of the source register $Rs_3$ to the target register $Rt_0$. Accordingly, executing the code fragment 110A requires initializing the register $Rt_0$, which is not used by any pre-existing register mappings, with the previously saved value of $Rs_3$:

$$Rt_0 = [Rt_{base} + \text{offset}(Rs_3)]$$

Figure 5:
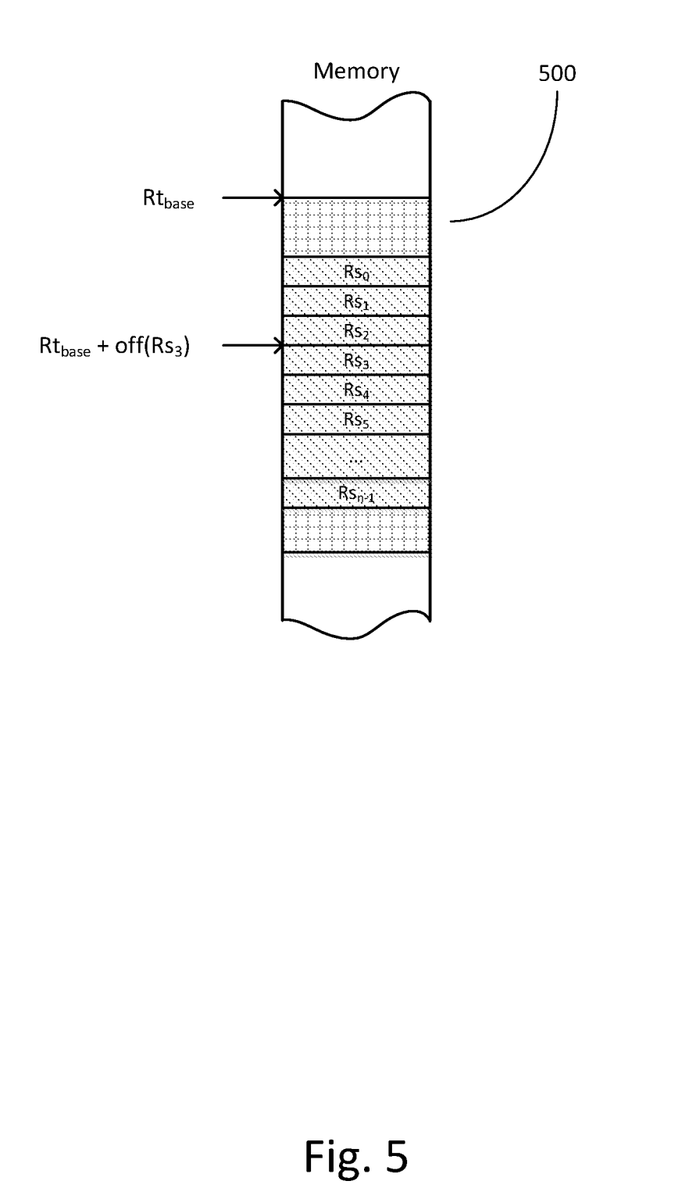
FIG. 5 schematically illustrate an example memory buffer utilized for storing the register values by systems and methods operating in accordance with one or more aspects of the present disclosure.

As schematically illustrated by FIG. 5, the memory buffer 500 utilized for storing the register values may be referenced by the pointer $Rt_{base}$ and indexed by offsets of the source registers $Rs_0$-$Rs_{n-1}$, such that $Rt_{base}$+offset ($Rs_i$) references the buffer allocated for storing the value of the source register $Rs_i$.

Furthermore, the tie code is required to reconcile the register mappings between the two code fragments, by saving/restoring target register values which have conflicting allocations in the two code fragments. As schematically illustrated by FIG. 4C, the register allocation $Rs_3$-$Rt_0$, which is utilized by processing the code fragment 110E, is then modified by processing the next code fragment 110F to associate the previously used target register $Rt_0$ with a different source register $Rs_6$. Accordingly, in order to preserve the value of $Rs_3$ which will be no longer stored by $Rt_0$, the current value of $Rt_0$ needs to be saved, before executing the generated target code fragment 110F, in the memory buffer allocated for Rs3:

$$[Rt_{base} + \text{offset}(Rs_3)] = Rt_0.$$

In an illustrative example, the register store operation may be performed by the following example instructions (IA-32):

$$\text{mov}[ESI + <\text{offsetof\_vcpu\_R3}>], ECX$$

where ECX is a temporary assigned target register for the source register R7, and ESI is the base register to point to the memory data structure utilized for storing register values (i.e. $Rt_{base}$)

In certain implementations, the tie code may be incorporated into the target code fragment generated by the current iteration of the method. Alternatively, the tie code may be incorporated into the code fragment to which the control is transferred from the current code fragment.

Figure 4D:
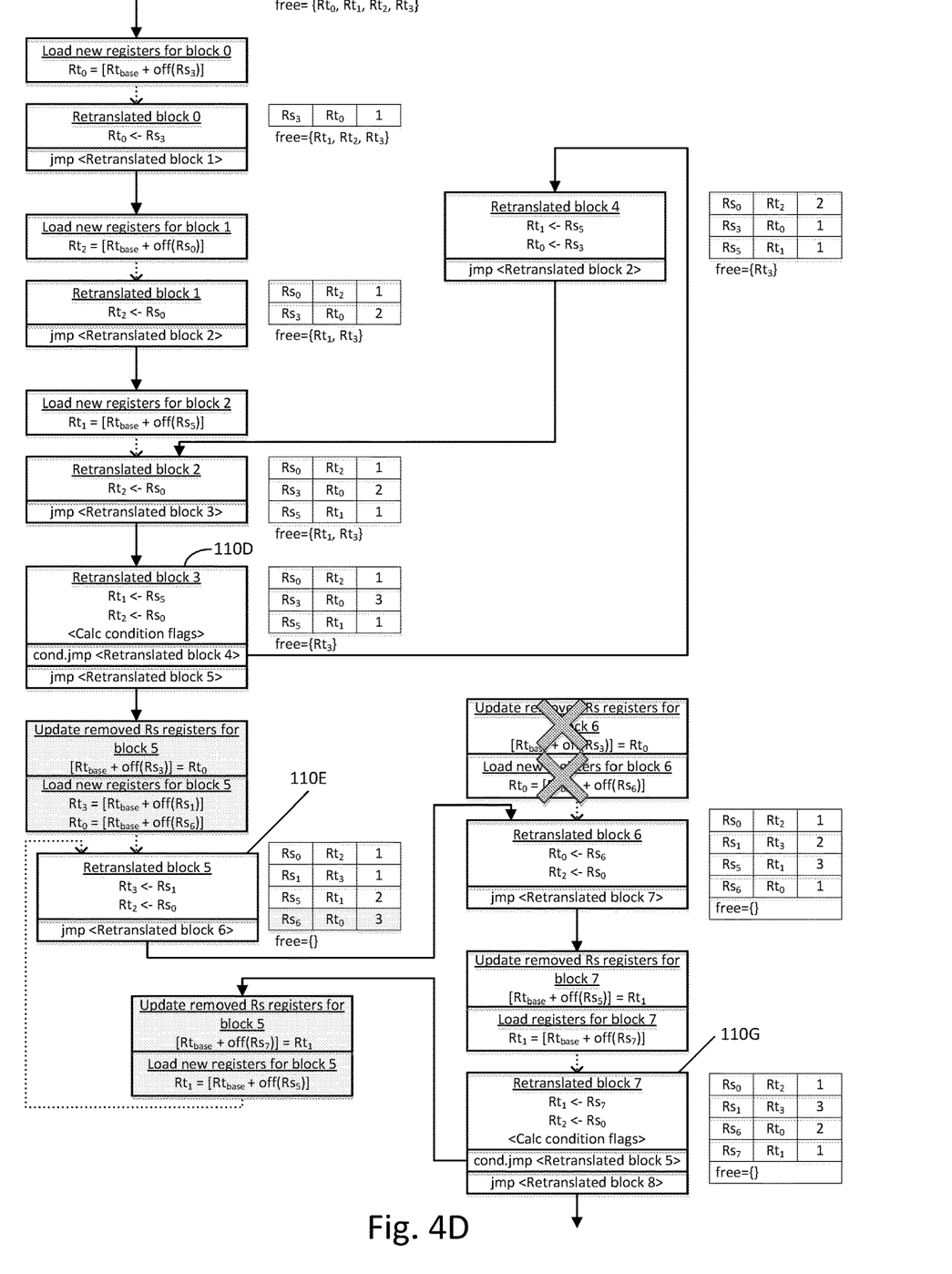

A given code fragment may receive control from different code fragments, which may have conflicting source-to-target register allocations, thus necessitating different tie code fragments for transferring the control to the given code fragment. As schematically illustrated by FIG. 4D, the code fragment 110E may receive control from the code fragment 110D or from the code fragment 110G. The two code fragments have conflicting register mappings for the target register $Rt_1$: the code fragment 110D utilizes the register mapping $Rs_5$-$Rt_1$, while the code fragment 110G utilizes the register mapping $Rs_7$-$Rt_1$. Accordingly, control transfer from the code fragment 110G to the code fragment 110E requires saving, in the memory buffer, the value of $Rs_7$, which will be no longer stored by $Rt_0$:

$$[Rt_{base} + \text{Offset}(Rs_7)] = Rt_0.$$

In an illustrative example, the register store operation may be performed by the following example instructions (IA-32):

$$\text{mov}[ESI + <\text{offsetof\_vcpu\_R7}>], EDX$$

where EDX is a temporary assigned target register for the source register R7, and ESI is the base register to point to the memory data structure utilized for storing register values (i.e. $Rt_{base}$).

Furthermore, control transfer from the code fragment 110G to the code fragment 110E requires initializing the register $Rt_1$, which is not used by the register mappings of the code fragment 110G, with the previously saved value of $Rs_5$:

$$Rt_1 = [Rt_{base} + \text{offset}(Rs_5)]$$

In an illustrative example, the register store operation may be performed by the following example instructions (IA-32):

$$\text{mov } EDX, [ESI + <\text{offsetof} + vcpu\_R1>]$$

where EDX is a temporary assigned target register for the source register R5, and ESI is the base register to point to the memory data structure utilized for storing register values (i.e. $Rt_{base}$).

Similarly, a new tie code fragment may be created if the target code fragment generated by the current iteration of the method transfers the control to a fragment of the code which has not yet been translated or if the register assignments for the two code fragments do not match.

Alternatively, if the control is transferred to a previously translated code fragment, and the register assignments match for the two code fragments, a previously generated tie code may be re-used. However, if the control is transferred to a previously translated code fragment, and the two code fragments have conflicting register assignments, a new tie code would be needed to save/restore the target register values which have conflicting allocations in the two code fragments.

Furthermore, a register loading tie code may be removed from the current block if the corresponding mapping has been added to the current block or one of the preceding blocks by subsequent iterations of the method. As schematically illustrated by FIG. 4B, the existing tie code 420 preceding the code fragment 110D for loading $Rt_1$ with the value of $Rs_5$ may be removed after processing the code fragment 110E which creates the mapping of $Rs_5$ to $Rt_1$. The block 110E transfers control to block 110C, which then transfers control to the current block 110D; thus, block 110D inherits the mapping of $Rs_5$ to $Rt_1$, which makes the tie code 420 redundant.

Furthermore, a register saving tie code may be needed if a register mapping which existed in the previous block is being removed in the current block. As schematically illustrated by FIG. 4C, the register allocation $Rs_3$-$Rt_0$, which is utilized by processing the code fragment 110E, is then modified by processing the next code fragment 110F to associate the previously used target register $Rt_0$ with a different source register $Rs_6$. Accordingly, in order to preserve the value of $Rs_3$ which will be no longer stored by $Rt_0$, the current value of $Rt_0$ needs to be saved, before executing the generated target code fragment 110F, in the memory buffer allocated for Rs3:

$$[Rt_{base} + \text{offset}(Rs_3)] = Rt_0.$$

In certain implementations, the method may iteratively modify the register assignments for the subsequent code fragments which have at least one source-to-target register mapping having the weight value which is greater than the sum of the pre-defined increment value (e.g., one) and the weight value associated with the same target platform register in the previous code fragment (i.e., the code fragment from which the control is transferred to the current code fragment). The method may terminate when all source code fragments have been processed and no register assignments and/or tie block fragments are modified by subsequent iterations of the method.

Referring again to FIG. 2, responsive to determining, at block 255, that a terminating condition has not been satisfied, the computer system may, at block 260, set a valid address for the control transfer instruction to reference the next code fragment to be processed (i.e., the code fragment to which the control is transferred by the code fragment which has been processed by the current iteration of the method).

At block 265, the computer system may iteratively adjust the register mapping weights of the translated code fragments which are executed subsequently to execution of the current code fragment, in order to reflect the usage of the registers by the just added tie code fragment, and the method may loop back to block 225;

Conversely, responsive to determining, at block 255, that the terminating condition has been satisfied, the method may terminate at block 265.

Figure 6:
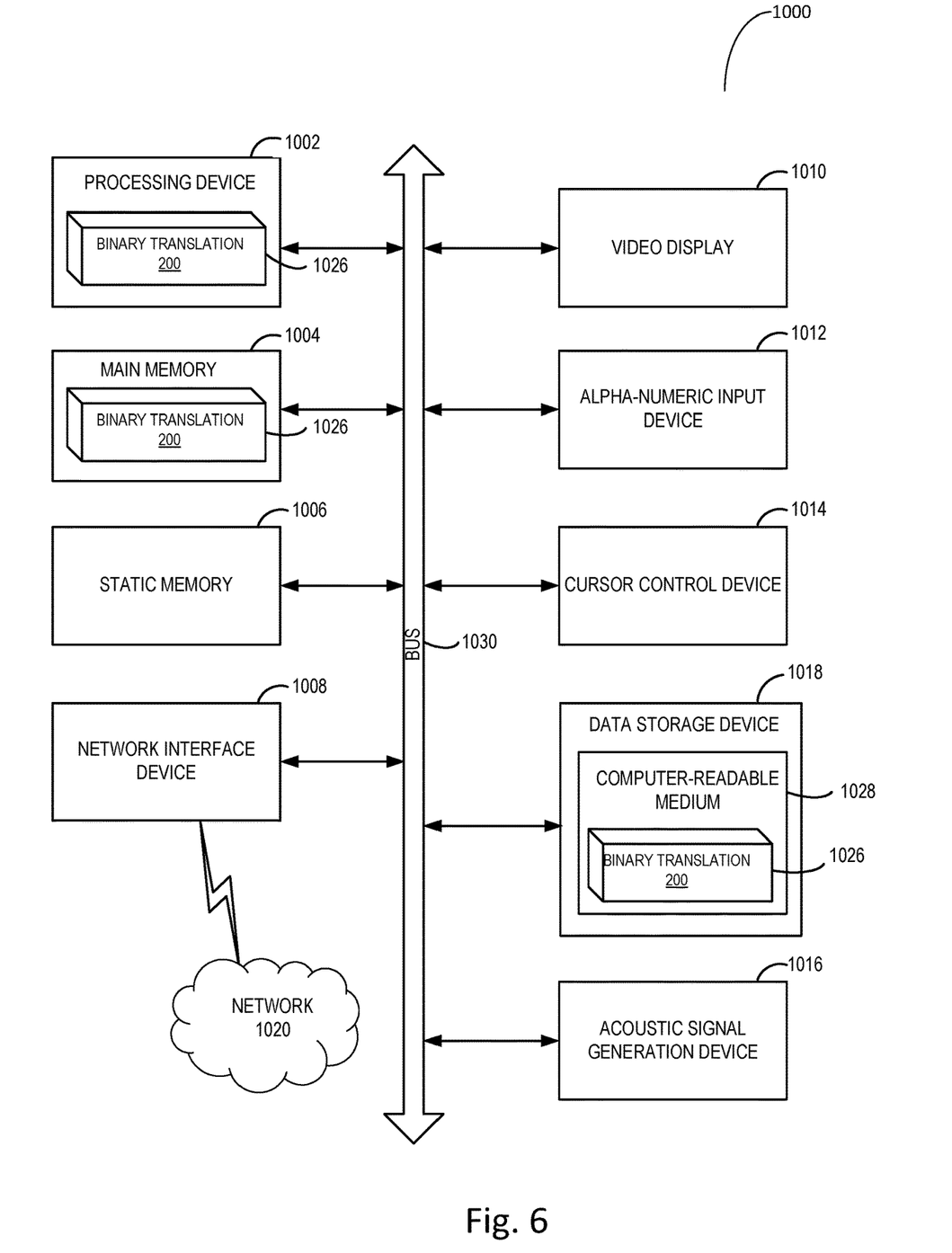
FIG. 6 schematically illustrates a component diagram of an example computer system which may perform any one or more of the methods described herein.

FIG. 6 schematically illustrates a component diagram of an example computer system 1000 which may perform any one or more of the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions implementing method 200 of binary translation, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. The Executable instructions 1026 may comprise executable instructions encoding various functions of method 200 of binary translation, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    decoding a current source code fragment compatible with a source instruction set architecture (ISA);
    identifying a first source register referenced by the current source code fragment;
    determining that the first source register is not referenced by a register mapping table, wherein the register mapping table comprises a plurality of entries, each entry specifying a source register, a target register, and a weight value, wherein the weight value is proportional to a value of a usage path length of the target register;
    identifying, among the plurality of mapping table entries, a mapping table entry comprising a highest weight value, wherein the identified mapping table entry specifies a second source register and a second target register;
    replacing, in the identified mapping table entry, an identifier of the second source register with an identifier of the first source register; and
    translating, using the mapping table entry, the current source code fragment into a target code fragment, wherein the target code fragment is compatible with a target ISA.

2. The method of claim 1, wherein the weight value is indicative of a number of binary translation iterations since the target register was utilized.

3. The method of claim 1, wherein the weight value is indicative of usage frequency of the target register.

4. The method of claim 1, further comprising:
setting the weight value of the identified mapping table entry to a pre-defined initial value.

5. The method of claim 1, further comprising:
responsive to identifying a second mapping table entry specifying a third source register, a third target register, and a third weight value, such that the third target register is not referenced by the input source code fragment, incrementing the third weight value by a pre-defined value.

6. The method of claim 1, further comprising:
generating a second target code fragment by processing a second source code fragment; and
generating a tie code for connecting the current target code fragment and the second target code fragment.

7. The method of claim 6, wherein the tie code performs at least one of: saving a first value of the first target register in a first memory buffer or retrieving a second value of the first target register from a second memory buffer.

8. The method of claim 1, further comprising:
processing a second source code fragment; and
removing a portion of a tie code associated with the current target code fragment.

9. The method of claim 8, further comprising:
iteratively processing source code fragments until tie code associated with corresponding target code fragments is stabilized.

10. The method of claim 1, further comprising:
processing a second source code fragment; and
modify a register mapping associated with the current target code fragment.

11. The method of claim 10, further comprising:
iteratively processing source code fragments until register mappings associated with corresponding target code fragments are stabilized.

12. A non-transitory computer-readable storage medium comprising executable instructions that, when executed by a computer system, cause the computer system to:
decode a current source code fragment compatible with a source instruction set architecture (ISA);
identify a first source register referenced by the current source code fragment;
determine that the first source register is not referenced by a register mapping table, wherein the register mapping table comprises a plurality of entries, each entry specifying a source register, a target register, and a weight value, wherein the weight value is proportional to a value of a usage path length of the target register;
identify, among the plurality of mapping table entries, a mapping table entry comprising a highest weight value, wherein the identified mapping table entry specifies a second source register and a second target register;
replace, in the identified mapping table entry, an identifier of the second source register with an identifier of the first source register; and
translate, using the mapping table entry, the current source code fragment into a target code fragment, wherein the target code fragment is compatible with a target ISA.

13. The non-transitory computer-readable storage medium of claim 12, wherein the weight value is indicative of a number of binary translation iterations since the target register was utilized.

14. The non-transitory computer-readable storage medium of claim 12, further comprising executable instructions causing the computer system to:
generate a second target code fragment by processing a second source code fragment; and
generate a tie code for connecting the current target code fragment and the second target code fragment.

15. The non-transitory computer-readable storage medium of claim 12, wherein the tie code performs at least one of: saving a first value of the first target register in a first memory buffer or retrieving a second value of the first target register from a second memory buffer.

* * * * *